(12) United States Patent
Harry Putra

(10) Patent No.: US 11,455,513 B2
(45) Date of Patent: Sep. 27, 2022

(54) HELLINGER DISTANCE FOR MEASURING ACCURACIES OF MEAN AND STANDARD DEVIATION PREDICTION OF DYNAMIC BOLTZMANN MACHINE

(71) Applicant: INTERNATIONAL BUSINESS MACHINES CORPORATION, Armonk, NY (US)

(72) Inventor: Rudy R. Harry Putra, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 910 days.

(21) Appl. No.: 16/264,863

(22) Filed: Feb. 1, 2019

(65) Prior Publication Data
US 2020/0250512 A1  Aug. 6, 2020

(51) Int. Cl.
G06N 3/04 (2006.01)
G06Q 40/04 (2012.01)
G06N 3/08 (2006.01)

(52) U.S. Cl.
CPC ......... G06N 3/0445 (2013.01); G06N 3/0454 (2013.01); G06N 3/08 (2013.01); G06Q 40/04 (2013.01)

(58) Field of Classification Search
CPC ...... G06N 3/0445; G06N 3/0454; G06N 3/08; G06Q 40/04
See application file for complete search history.

(56) References Cited

U.S. PATENT DOCUMENTS

| 2005/0134499 A1* | 6/2005 | Liu ................... G01S 5/0289 342/149 |
| 2015/0199175 A1* | 7/2015 | Wang ................... G06F 7/58 708/250 |
| 2016/0092767 A1 | 3/2016 | Osogami et al. |

(Continued)

OTHER PUBLICATIONS

Petropoulos et al. (A stacked generalization system for automated FOREX portfolio trading, Dec. 2017, pp. 290-302) (Year: 2017).*

(Continued)

*Primary Examiner* — George Giroux
(74) *Attorney, Agent, or Firm* — Tutunjian & Betitto, P.C.; Randall Bluestone

(57) ABSTRACT

A method is provided for commodity management. The method generates, using a Dynamic Boltzmann Machine (DyBM), a future mean prediction and a future standard deviation prediction of a financial time-series dataset for a commodity. The method measures, using Hellinger Distance (HD), an accuracy of the future mean prediction and the future standard deviation prediction. The method combines the future mean prediction and the future standard deviation prediction with the Hellinger Distance to determine a DyBM trustworthy prediction time period in which predictions by the DyBM, including the future mean prediction and the future standard deviation prediction, are deemed trustworthy. The method selectively performs an action relating to an ownership of the commodity based on at least one of the future mean prediction and the future standard deviation prediction, responsive to the future mean prediction and the future standard deviation prediction being generated during the DyBM trustworthy prediction time period.

20 Claims, 8 Drawing Sheets

(56) References Cited

U.S. PATENT DOCUMENTS

| | | |
|---|---|---|
| 2016/0098631 A1 | 4/2016 | Osogami et al. |
| 2018/0060729 A1 | 3/2018 | Osogami |
| 2018/0129968 A1 | 5/2018 | Osogami |
| 2018/0144266 A1 | 5/2018 | Osogami |
| 2018/0268285 A1 | 9/2018 | Dasgupta |
| 2019/0098039 A1* | 3/2019 | Gates .................... G16H 50/70 |
| 2019/0220738 A1* | 7/2019 | Flank ...................... G06N 3/08 |

OTHER PUBLICATIONS

Lyon et al. (Hellinger Distance Trees for Imbalanced Streams, 2014, pp. 1969-1974) (Year: 2014).*

Das et al. (Unsupervised extreme learning machine and support vector regression hybrid model for predicting energy commodity futures index, 2017, pp. 333-346) (Year: 2017).*

Dasgupta et al., "Regularized Dynamic Boltzmann Machine with Delay Pruning for Unsupervised Learning of Temporal Sequences", arXiv:1610.01989v1 [cs.LG] Sep. 22, 2016, 6 pages.

Dasgupta et al., "Nonlinear Dynamic Boltzmann Machines for Time-Series Prediction", Proceedings of the Thirty-First AAAI Conference on Artificial Intelligence (AAAI-17), Feb. 2017, pp. 1833-1839.

Kajino, Hiroshi, "A Functional Dynamic Boltzmann Machine", Proceedings of the Twenty-Sixth International Joint Conference on Artificial Intelligence (IJCAI-17), Aug. 2017, pp. 1987-1993.

Montavon et al., "Wasserstein Training of Restricted Boltzmann Machines", 30th Conference on Neural Information Processing Systems (NIPS 2016), Dec. 2016, pp. 1-9.

Osogami et al., "Learning the Values of the Hyperparameters of A Dynamic Boltzmann Machine", IBM J. Res. & Dev. vol. 61 No. 4/5 Paper 8 Jul./Sep. 2017, pp. 1-8.

Osogami et al., "Seven Neurons Memorizing Sequences of Alphabetical Images Via Spike-timing Dependent Plasticity", Scientific Reports, Sep. 2015, pp. 1-13.

* cited by examiner

HELLINGER DISTANCE FOR MEASURING ACCURACIES OF MEAN AND STANDARD DEVIATION PREDICTION OF DYNAMIC BOLTZMANN MACHINE

BACKGROUND

Technical Field

The present invention generally relates to machine learning, and more particularly to a Hellinger distance for measuring accuracies of mean and standard deviation prediction of Dynamic Boltzmann Machine (DyBM).

Description of the Related Art

A Dynamic Boltzmann Machine (DyBM) is effective for predicting the time-varying mean (the first-order moment) of a time series. A DyBM can be trained online to cope with time-varying means by maximizing log-likelihood that assumes the second-order moment is constant (i.e., the second-order moment is the same for all periods).

For particular time-series datasets, like those in financial markets, the volatility (standard deviation/variance) varies with time. These volatility measures are often derived from the second-order moment of the time series.

Sudden drops of price indices often correspond to high volatility. If one wants to avoid such market turbulences, predicting the time-varying volatility can be much more important than predicting the mean.

A DyBM can be trained to predict the standard deviation of financial time series with better accuracies than predicting the mean, but having the prediction tuple of (mean, standard deviation), it is not trivial how to measure the accuracies of the combined tuple. A standard method involves using Negative Log-Likelihood (NLL), but the NLL does not explicitly take into account the correlation between the actual value of the standard deviation and its prediction. The NLL penalizes prediction during the period when the predicted standard deviation is high regardless of the correctness of the predicted mean and standard deviation. Therefore, using the NLL can lead to loss of opportunities to obtain better yields.

Accordingly, an alternative method to NLL is required to measure the accuracy of a DyBM predicting mean and standard deviation.

SUMMARY

According to an aspect of the present invention, a computer-implemented method is provided for commodity management. The method includes generating, by a processor using a Dynamic Boltzmann Machine (DyBM), both a future mean prediction and a future standard deviation prediction of a financial time-series dataset for a commodity. The method further includes measuring, by the processor using Hellinger Distance (HD), an accuracy of the future mean prediction and the future standard deviation prediction. The method also includes combining, by the processor, the future mean prediction and the future standard deviation prediction of the DyBM with the Hellinger Distance to determine a DyBM trustworthy prediction time period in which predictions by the DyBM, including the future mean prediction and the future standard deviation prediction, are deemed trustworthy. The method additionally includes selectively performing, by the processor, an action relating to an ownership of the commodity based on at least one of the future mean prediction and the future standard deviation prediction, responsive to the future mean prediction and the future standard deviation prediction being generated during the DyBM trustworthy prediction time period.

According to another aspect of the present invention, a computer program product is provided for commodity management. The computer program product includes a non-transitory computer readable storage medium having program instructions embodied therewith. The program instructions are executable by a computer to cause the computer to perform a method. The method includes generating, by a processor using a Dynamic Boltzmann Machine (DyBM), both a future mean prediction and a future standard deviation prediction of a financial time-series dataset for a commodity. The method further includes measuring, by the processor using Hellinger Distance (HD), an accuracy of the future mean prediction and the future standard deviation prediction. The method also includes combining, by the processor, the future mean prediction and the future standard deviation prediction of the DyBM with the Hellinger Distance to determine a DyBM trustworthy prediction time period in which predictions by the DyBM, including the future mean prediction and the future standard deviation prediction, are deemed trustworthy. The method additionally includes selectively performing, by the processor, an action relating to an ownership of the commodity based on at least one of the future mean prediction and the future standard deviation prediction, responsive to the future mean prediction and the future standard deviation prediction being generated during the DyBM trustworthy prediction time period.

According to yet another aspect of the present invention, a computer processing system is provided for commodity management. The computer processing system includes a memory for storing program code. The computer processing system further includes a processor operatively coupled to the memory for running the program code to generate, using a Dynamic Boltzmann Machine (DyBM), both a future mean prediction and a future standard deviation prediction of a financial time-series dataset for a commodity. The processor further runs the program code to measure, using Hellinger Distance (HD), an accuracy of the future mean prediction and the future standard deviation prediction. The processor also runs the program code to combine the future mean prediction and the future standard deviation prediction of the DyBM with the Hellinger Distance to determine a DyBM trustworthy prediction time period in which predictions by the DyBM, including the future mean prediction and the future standard deviation prediction, are deemed trustworthy. The processor additionally runs the program code to selectively perform an action relating to an ownership of the commodity based on at least one of the future mean prediction and the future standard deviation prediction, responsive to the future mean prediction and the future standard deviation prediction being generated during the DyBM trustworthy prediction time period.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a Hellinger distance for measuring accuracies of mean and standard deviation prediction of a Dynamic Boltzmann Machine (DyBM).

In an embodiment, the present invention can involve: (i) predicting, using a DyBM, both the future mean and standard deviation of a financial time-series dataset; (ii) measuring, using Hellinger Distance (HD), the accuracy of the DyBM predicting mean and standard deviation instead of using Negative Log-Likelihood (NLL); and combining the mean and standard deviation prediction of DyBM with the Hellinger Distance to determine when to trust the prediction of the DyBM. The Hellinger Distance is used to quantify and/or otherwise the similarity between two probability distributions.

Further regarding (i), the mean and the standard deviation can be predicted either separately by two DyBMs or collectively by one DyBM.

Further regarding (ii), the Hellinger Distance takes into account the period the DyBM can accurately predict both the mean and the standard deviation. To determine a period of "good-timing" in which to trust the prediction of DyBM, one can take the moving average of the HD for a given period (e.g., the last 1 year, or 3 months, or 1 month, and so forth). The Hellinger Distance has several nice properties that NLL does not have, such as, for example, but not limited to the following: symmetricity; always takes values between 0 and 1 (the lower the value, the closer the two distributions, i.e., the better accuracy of the DyBM), and obeys the triangle inequality.

Further regarding (ii), with regard to a 1-year moving average of the Hellinger Distance (HD), if performing a trade (buy/sell) according to the DyBM's prediction when its HD score is below some threshold, it can be shown that the profits can be larger than operating with Negative Log-Likelihood (NLL) for, for example, a Japan 10-year Bond (GJGB10), a Japanese Stock (NKY), U.S. Stock (SPX), and at least the same for, for example, a U.S. 10-year Bond (USGG10YR).

Figure 1:
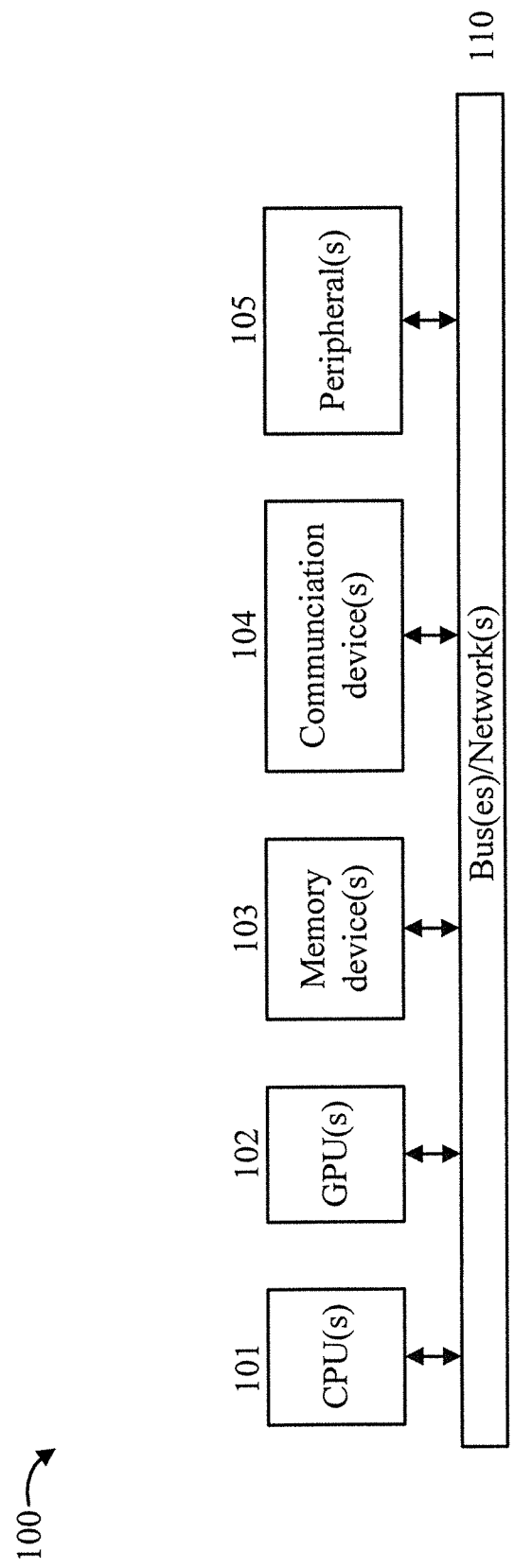
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A description will now be given regarding two exemplary environments 200 and 300 to which the present invention can be applied, in accordance with various embodiments of the present invention. The environments 200 and 300 are described below with respect to FIGS. 2 and 3, respectively. In further detail, the environment 200 includes a prediction system operatively coupled to a controlled system, while the environment 300 includes a prediction system as part of a controlled system. Moreover, any of environments 200 and 300 can be part of a cloud-based environment (e.g., see FIGS. 6-7). These and other environments to which the present invention can be applied are readily determined by one of ordinary skill in the art, given the teachings of the present invention provided herein, while maintaining the spirit of the present invention.

Figure 2:
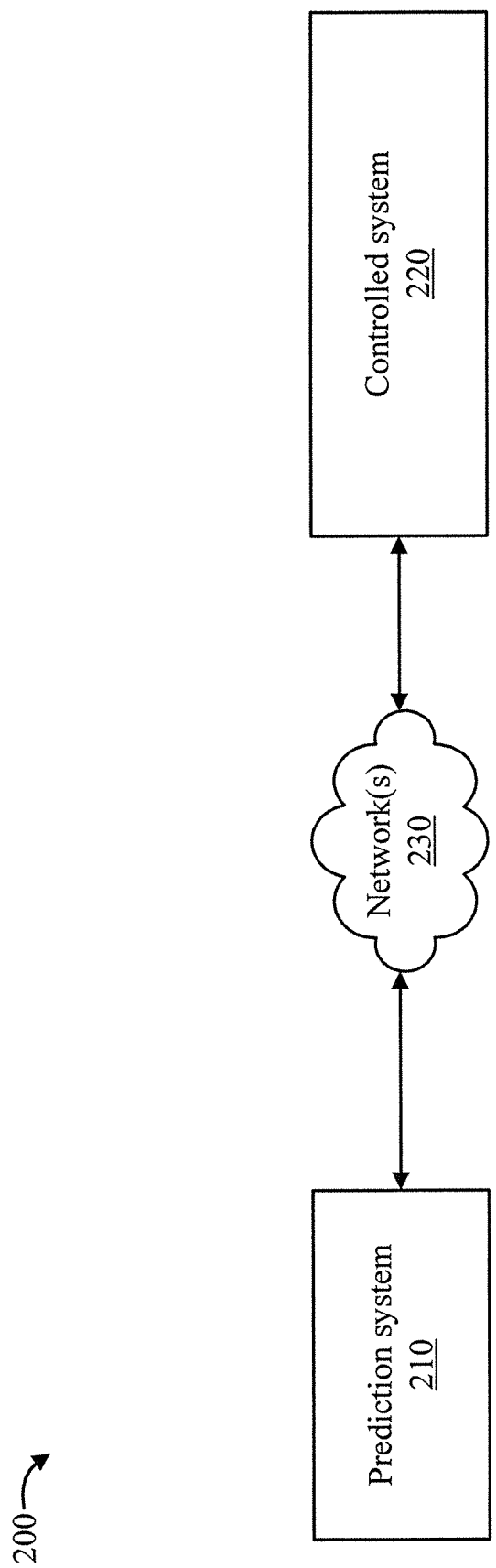
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a controlled system 220 and prediction system 210. The prediction system 210 and the controlled system 220 are configured to enable communications therebetween. For example, transceivers and/or other types of communication devices including wireless, wired, and combinations thereof can be used. In an embodiment, communication between the prediction system 210 and the controlled system 220 can be performed over one or more networks, collectively denoted by the figure reference numeral 230. The communication can include, but is not limited to, time series data or other data from the controlled system 220, and predictions and action initiation control signals from the prediction system 210. The controlled system 220 can be any type of processor-based system such as, for example, but not limited to, a banking system, a trading system, an access system, a surveillance system, a manufacturing system (e.g., an assembly line), an Advanced Driver-Assistance System (ADAS), and so forth.

The controlled system 220 provides data (e.g., time-series data or other data) to the prediction system 210 which uses the data for learning and to make predictions.

A DyBM includes a network of neurons and memory units. A pre-synaptic neuron is connected to a post-synaptic neuron via a FIFO queue. The spike from the pre-synaptic neuron reaches the post-synaptic neuron after a constant conduction delay. Each neuron has the memory unit for storing neural eligibility traces, which summarize the neuron's activities in the past. A synaptic eligibility trace is associated with a synapse between a pre-synaptic neuron and a post-synaptic neuron, and summarizes the spikes that have arrived at the synapse, via the FIFO queue, from the pre-synaptic neuron.

Hence, the DyBM can be viewed as fully-connected recurrent neural network with memory units and with conduction delays between units implemented in the form of fixed length first-in first-out (FIFO) queues. A spike originating at a pre-synaptic neuron (unit) travels along this FIFO queue and reaches the post-synaptic neuron after a fixed delay. The length of the FIFO queues is equal to one minus the maximum delay value.

In general, the DyBM is designed for learning temporal pattern sequences.

The controlled system 220 can be controlled based on a prediction generated by the prediction system 210. For example, the action can include a trading of the commodity. In an embodiment, the action can include selling the commodity to mitigate a financial loss relating to keeping the set of commodify, responsive to the future mean prediction and the future standard deviation prediction of the DyBM being determined as trusted. In an embodiment, the action can include buying the commodity to enhance a financial gain relating to a lack of ownership of the commodity, responsive to the future mean prediction and the future standard deviation prediction of the DyBM being determined as trusted. The action can be or involve a trading strategy at time t as follows: If the 1-year moving average of the Hellinger Distance of the DyBM's prediction up to the previous 10 days is below a threshold, then buy or sell according to the DyBM's predictions. For example, for a given stock, if the return prediction is positive, then buy, while if the return prediction is negative, then sell.

As another example, based on a forecast that a machine will fail in x time steps, a corresponding action (e.g., power down machine, enable machine safeguard to prevent injury/etc., and/or so forth) can be performed at t<x in order to avoid the failure from actually occurring.

As another example, based on a trajectory of an intruder, a surveillance system being controlled could lock or unlock one or more doors in order to secure someone in a certain place (holding area) and/or guide them to a safe place (safe room) and/or restrict them from a restricted place and/or so forth. Verbal (from a speaker) or displayed (on a display device) instructions could be provided along with the locking and/or unlocking of doors (or other actions) in order to guide a person.

As a further example, a vehicle can be controlled (braking, steering, accelerating, and so forth) to avoid an obstacle that is predicted to be in a car's way responsive to a DyBM prediction.

As a yet further example, the present invention can be incorporated into a computer system in order to forecast impending failures and take action before the failures occur, such as switching a component that will soon fail with another component, routing through a different component, processing by a different component, and so forth.

It is to be appreciated that the preceding actions are merely illustrative and, thus, other actions (some of which are described relative to FIGS. 3-4) can also be performed depending upon the implementation, as readily appreciated by one of ordinary skill in the art given the teachings of the present invention provided herein, while maintaining the spirit of the present invention.

In an embodiment, the prediction system 210 can be implemented as a node in a cloud-computing arrangement. In an embodiment, a single prediction system 210 can be assigned to a single controlled system or to multiple controlled systems e.g., different robots in an assembly line, and so forth). These and other configurations of the elements of environment 200 are readily determined by one of ordinary skill in the art given the teachings of the present invention provided herein, while maintaining the spirit of the present invention.

Figure 3:
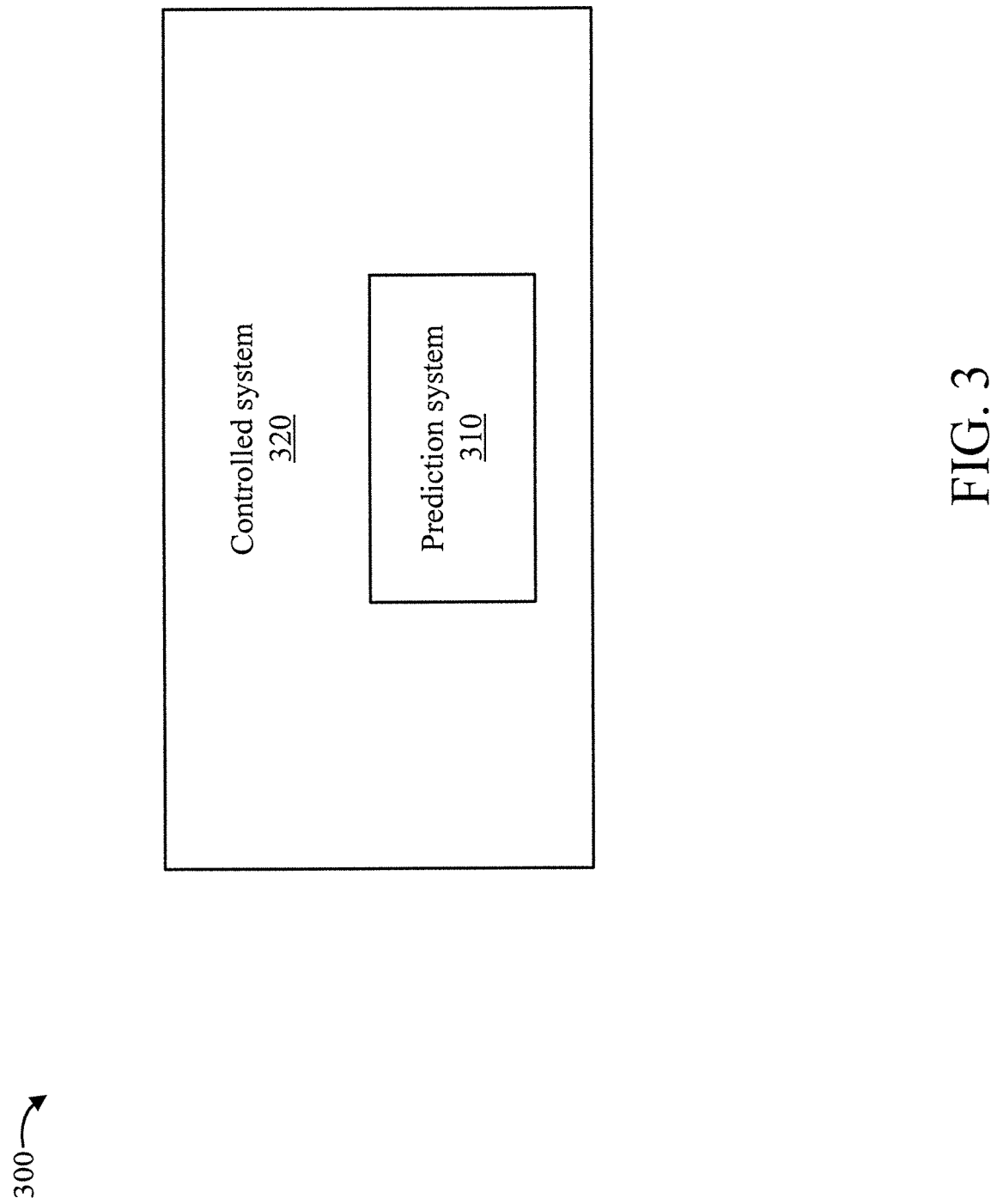
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a controlled system 320 that, in turn, includes a prediction system 210. One or more communication buses and/or other devices can be used to facilitate inter-system, as well as intra-system, communication. The controlled system 320 can be any type of processor-based system such as, for example, but not limited to, a banking system, a trading system, an access system, a surveillance system, a manufacturing system (e.g., an assembly line), an Advanced Driver-Assistance System (ADAS), computer processing, and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

Figure 4:
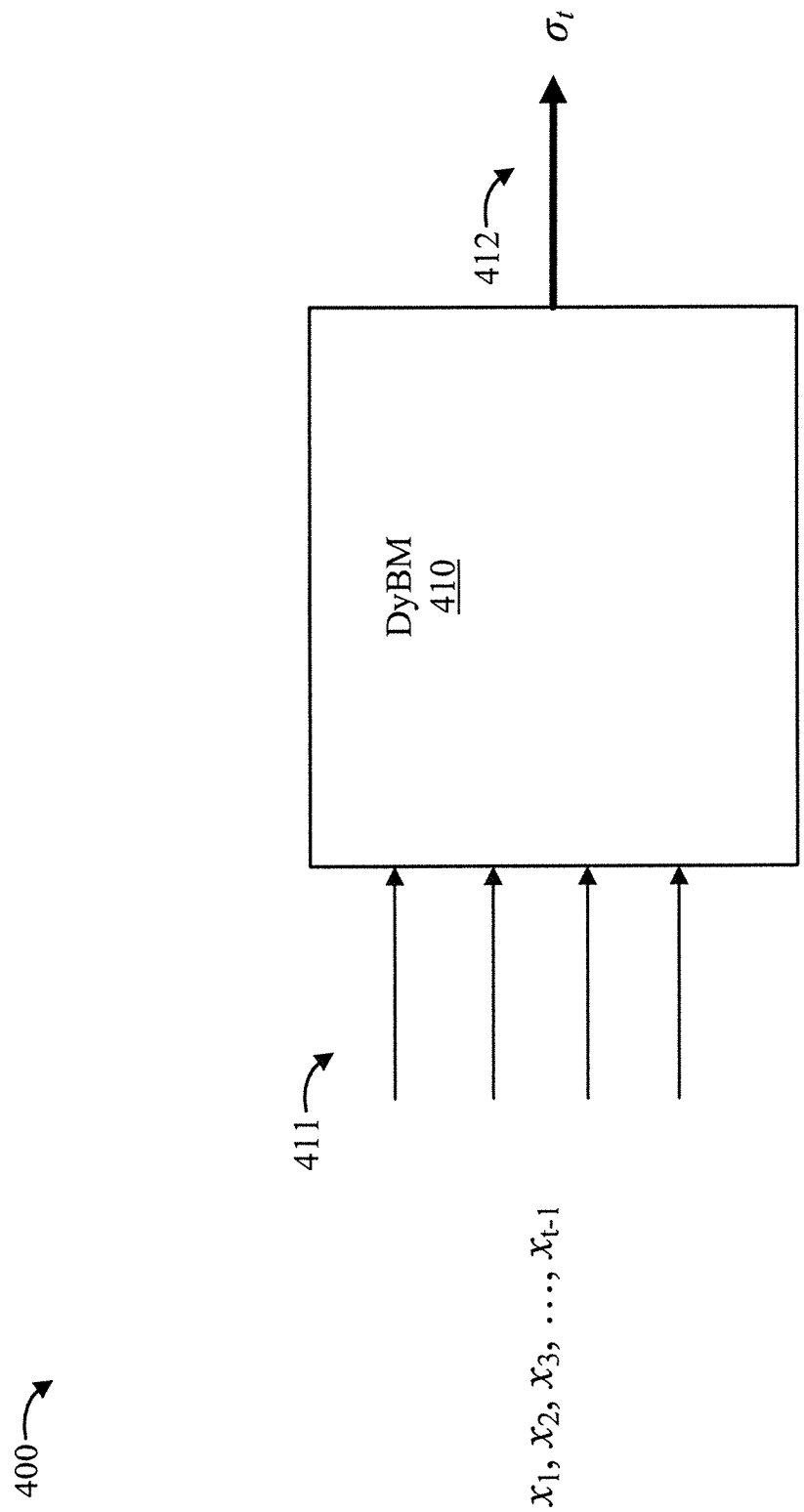
FIG. 4 is a block diagram showing an exemplary prediction of mean and standard deviation of return time series with DyBM, in accordance with an embodiment of the present invention.

FIG. 4 is a block diagram showing an exemplary prediction 400 of mean and standard deviation of return time series with DyBM, in accordance with an embodiment of the present invention.

Different from conventional approaches, here a DyBM 410 is used to predict the movement of a standard deviation of a return of 10 days ahead. However, prediction for any number of days or other length of time can also be considered by constructing a corresponding DyBM.

The input 411 to the DyBM 410 can include time series data $x_1, x_2, x_3, \ldots, x_{t-1}$.

Hence, the input 411 can include the most important daily return time-series, other daily return time-series, financial index scores (such as, scores depicting the volatility, degree of changes, and so on), and 10-day, 22-day, and 66-day standard deviation time-series. The period length of standard deviation time-series can be adjusted, and the training results can be used to determine which is better for increasing the accuracy of the prediction.

The output 412 is a prediction(s) of the 10 day ahead of standard deviation of returns of the following time series: GJGB10; NKY; SPX; and USGG10YR. Note that other time series for different future period time can be the target of predictions.

The prediction(s) of the standard deviation is (are) aimed to predict the following true values of standard deviation which is defined as below. Notice that $r_{t+\delta}$ is the return value at day t+δ, and $E[r_t]$ is the mean of the return values during a certain period (ten days at the equation below). The true values are not known during the prediction, but they can be computed during training period to train the DyBM that learns how to predict them. Hence, $$\sigma_t = \sqrt{\frac{1}{10}\sum_{\delta=0}^{9}(r_{t+\delta} - E[r_t])^2}$$

Figure 5:
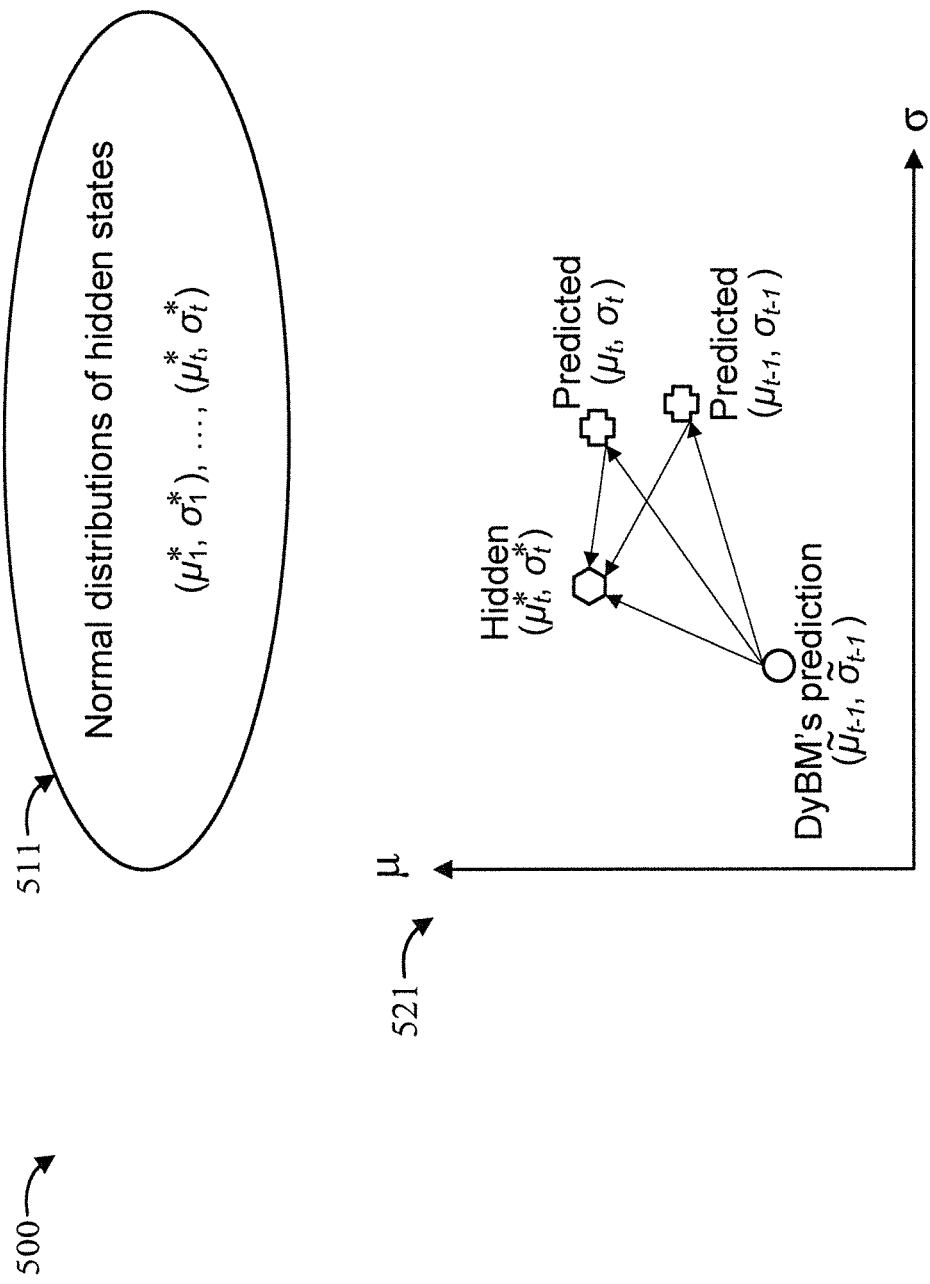
FIG. 5 is a diagram showing the use case for using a DyBM to predict time-series, in accordance with an embodiment of the present invention.

FIG. 5 is a diagram showing the use case 500 for using a DyBM to predict time-series, in accordance with an embodiment of the present invention.

Assuming that the target of prediction of time series is generated by normal distributions, from normal distributions 511 of hidden (i.e., unobservable) states and Hellinger Distance, a prediction can be made as to when (in term of a time period) the DyBM can produce accurate future mean predictions and future standard deviation predictions.

The time series are assumed to follow normal distributions 511 that involve the following time-varying tuples of mean and standard deviation:

$(\mu_t^*, \sigma_1^*), \ldots, (\mu_t^*, \sigma_t^*)$

As shown from the plot 521, from the hidden states ($\mu_t^*$, $\sigma_t^*$), its distances to the prediction ($\mu_t$, $\sigma_t$) and the prediction ($\mu_{t-1}$, $\sigma_{t-1}$), the DyBM prediction ($\tilde{\mu}_{t-1}$, $\tilde{\sigma}_{t-1}$) can be obtained as they lie in a fixed dimensional space (the dimension is two in the figure).

Given P: ($\mu_p$, $\sigma_p$) and Q: ($\mu_q$, $\sigma_q$), Hellinger's Distance can be calculated as follows, which can easily be extended for multidimensional normal distribution:

$$\sqrt{1 - \sqrt{\frac{2\sigma_p\sigma_p}{\sigma_p^2 + \sigma_q^2}}\exp\left(\frac{-1}{4}\frac{(\mu_p - \mu_q)^2}{\sigma_p^2 + \sigma_q^2}\right)}$$

Properties of the Hellinger Distance include, for example, symmetricity, score with values within [0,1], satisfies triangle inequalities, fits to Mahalanobis distance, and so forth. Regarding satisfying triangle inequalities, the smaller the Hellinger Distance, the more likely the predicted values are closer to the unobserved true values.

Figure 6:
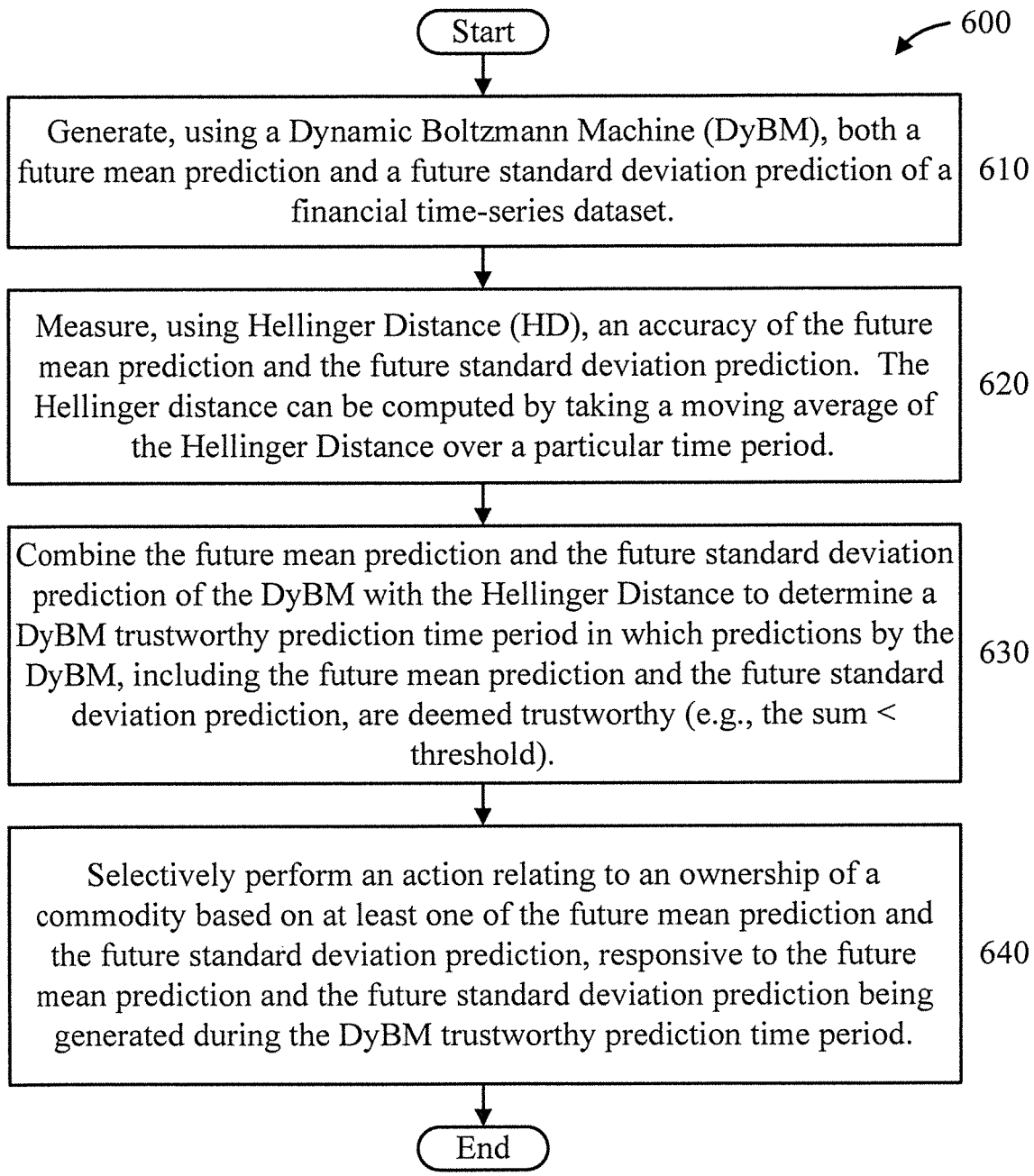
FIG. 6 is a flow diagram showing an exemplary method for using Hellinger Distance to measure accuracies of a future mean prediction and a future standard deviation prediction of a set of Dynamic Boltzmann Machines, in accordance with an embodiment of the present invention.

FIG. 6 is a flow diagram showing an exemplary method 600 for using Hellinger Distance to measure accuracies of a future mean prediction and a future standard deviation prediction of a set of Dynamic Boltzmann Machines, in accordance with an embodiment of the present invention. The method 600 can be used for commodity (stocks, bonds, options, etc.) management, as well as other applications as readily appreciated by one of ordinary skill in the art given the teachings of the present invention provided herein. For example, while time series data input to method 600 can include financial time-series data, in other applications, time series data for computer components, manufacturing, and so forth can be used, while maintaining the spirit of the present invention. However, for the sake of illustration, the method will be described primarily with respect to the aforementioned commodity management application.

At block 610, generate, using a Dynamic Boltzmann Machine (DyBM), both a future mean prediction and a future standard deviation prediction of a financial time-series dataset.

At block 620, measure, using Hellinger Distance (HD), an accuracy of the future mean prediction and the future standard deviation prediction. In an embodiment, the summary of recent Hellinger distance can be computed by taking a moving average of the Hellinger Distance over a particular time period in the past.

The Hellinger Distance takes into account the DyBM trustworthy prediction time period in which the DyBM can accurately predict both the future mean prediction and the future standard deviation prediction from among a plurality of periods, wherein the DyBM lacks a desired degree of accuracy during at least some of the plurality of periods other than the DyBM trustworthy prediction time period. Thus, having the summary of recent Hellinger distances, the current period can be determined to be either the period with recent Hellinger distance closer to true values (or, high-accuracy period), or the period with recent Hellinger distance far from true values (or, low-accuracy period). Based on the determination, a threshold can be used to set a policy to guide when to trust the predictions of DyBM.

At block 630, combine the future mean prediction and the future standard deviation prediction of the DyBM with the Hellinger Distance to determine a DyBM trustworthy prediction time period in which predictions by the DyBM, including the future mean prediction and the future standard deviation prediction, are deemed trustworthy. The future mean prediction and the future standard deviation prediction of the DyBM are determined to be trusted, corresponding to the DyBM trustworthy prediction time period, when a sum of the future mean prediction and the future standard deviation prediction and the Hellinger distance is lesser a threshold than is determined from the summary of recent Hellinger distances. The future mean prediction and the future standard deviation prediction of the DyBM are determined to be untrusted, corresponding to other time periods other than the DyBM trustworthy prediction time period from among a plurality of time periods, when a sum of the future mean prediction and the future standard deviation prediction and the Hellinger distance is equal to or bigger than a threshold.

At block 640, selectively perform an action relating to an ownership of a commodity based on at least one of the future mean prediction and the future standard deviation prediction, responsive to the future mean prediction and the future standard deviation prediction being generated during the DyBM trustworthy prediction time period.

In an embodiment, the action can include a trading of the commodity. In an embodiment, the action can include selling the commodity to mitigate a financial loss relating to keeping the set of commodify, responsive to the future mean prediction and the future standard deviation prediction of the DyBM being determined as trusted. In an embodiment, the action can include buying the commodity to enhance a financial gain relating to a lack of ownership of the commodity, responsive to the future mean prediction and the future standard deviation prediction of the DyBM being determined as trusted.

It is to be appreciated that the method can be used with one or two DyBMs. For example, in one embodiment, the same DyBM can generate both the future mean prediction and the future standard deviation prediction, while in another embodiment, different DyBMs can be used to generate the future mean prediction and the future standard deviation prediction, respectively.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
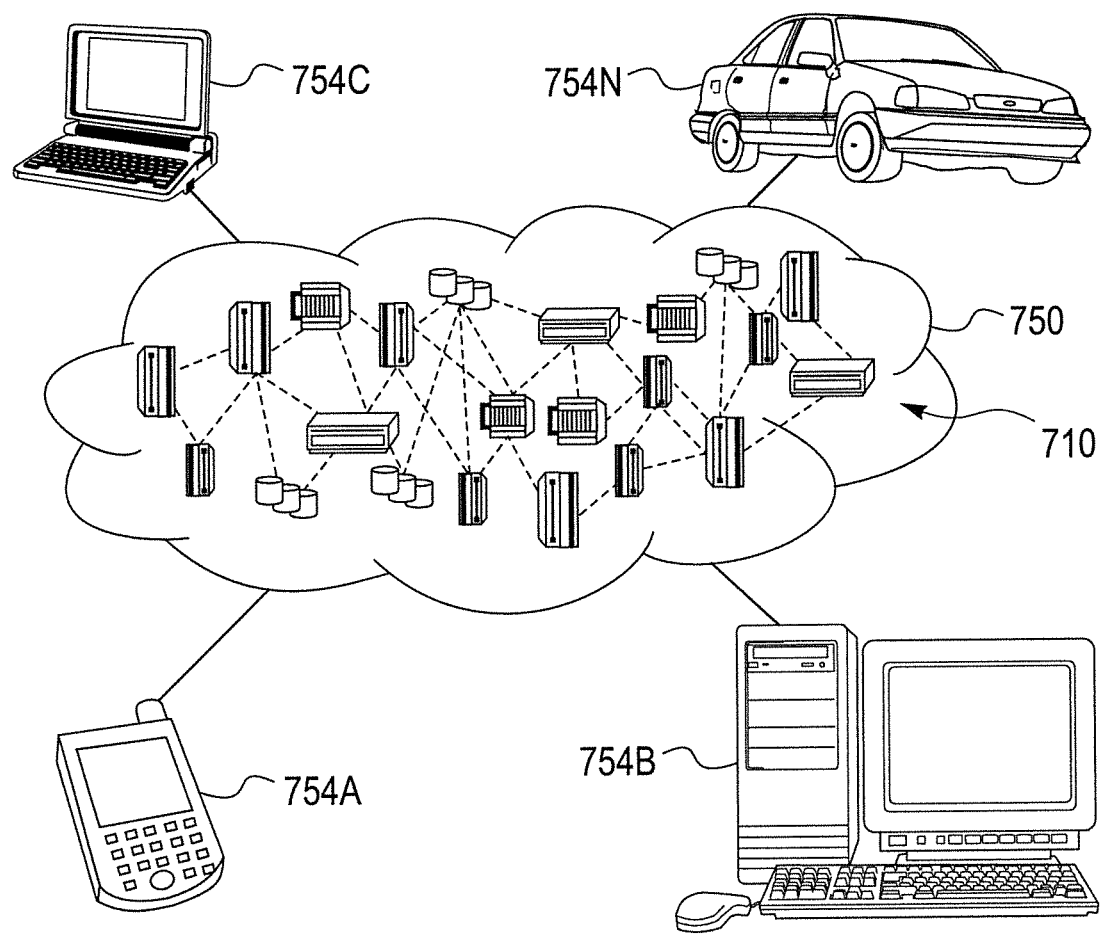
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
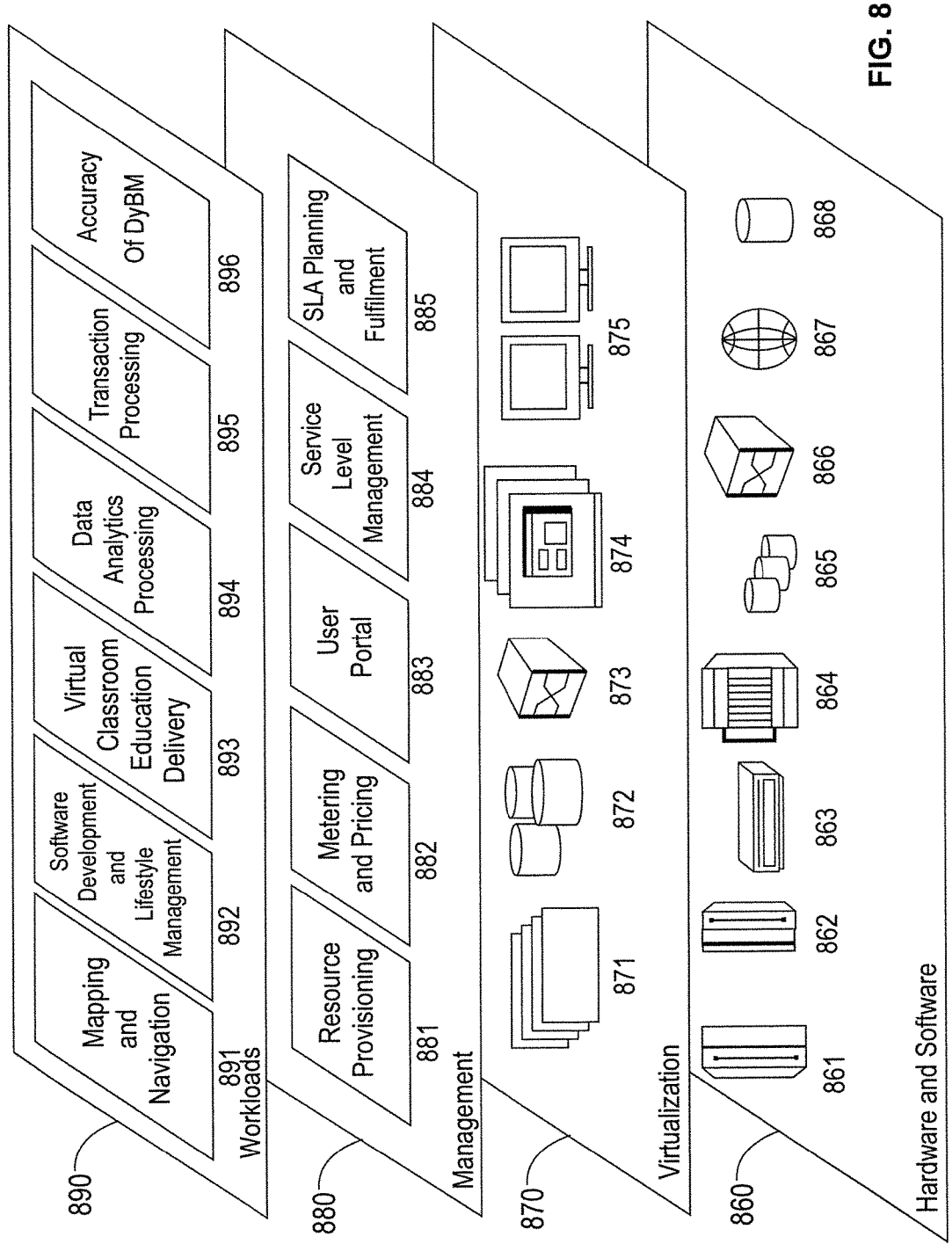
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; Hellinger Distance for measuring accuracies of a future mean prediction and a future standard deviation prediction of a Dynamic Boltzmann Machine (DyBM) 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for commodity management, comprising:
    generating, by a processor using a Dynamic Boltzmann Machine (DyBM), both a future mean prediction and a future standard deviation prediction of a financial time-series dataset for a commodity;
    measuring, by the processor using Hellinger Distance (HD), an accuracy of the future mean prediction and the future standard deviation prediction;
    combining, by the processor, the future mean prediction and the future standard deviation prediction of the DyBM with the Hellinger Distance to determine a DyBM trustworthy prediction time period in which predictions by the DyBM, including the future mean prediction and the future standard deviation prediction, are deemed trustworthy; and
    selectively performing, by the processor, an action relating to an ownership of the commodity based on at least one of the future mean prediction and the future standard deviation prediction, responsive to the future mean prediction and the future standard deviation prediction being generated during the DyBM trustworthy prediction time period.

2. The computer-implemented method of claim 1, wherein the DyBM comprises two DyBMs, and wherein the future mean prediction and the future standard deviation prediction are predicted separately by the two DyBMs.

3. The computer-implemented method of claim 1, wherein the future mean prediction and the future standard deviation prediction are predicted collectively by only one DyBM.

4. The computer-implemented method of claim 1, wherein the Hellinger Distance takes into account the DyBM trustworthy prediction time period in which the DyBM can accurately predict both the future mean prediction and the future standard deviation prediction from among a plurality of periods, wherein the DyBM lacks a specified degree of accuracy during at least some of the plurality of periods other than the DyBM trustworthy prediction time period.

5. The computer-implemented method of claim 1, wherein the action comprises a trading of the commodity.

6. The computer-implemented method of claim 1, wherein the action comprises selling the commodity to mitigate a financial loss relating to keeping the commodity, responsive to the future mean prediction and the future standard deviation prediction of the DyBM being determined as trusted.

7. The computer-implemented method of claim 1, wherein the action comprises buying the commodity to enhance a financial gain relating to a lack of ownership of the commodity, responsive to the future mean prediction and the future standard deviation prediction of the DyBM being determined as trusted.

8. The computer-implemented method of claim 1, wherein the future mean prediction and the future standard deviation prediction of the DyBM are determined to be trusted, corresponding to the DyBM trustworthy prediction time period, when a sum of the future mean prediction and the future standard deviation prediction and the Hellinger distance is greater than a threshold.

9. The computer-implemented method of claim 1, wherein the future mean prediction and the future standard deviation prediction of the DyBM are determined to be untrusted, corresponding to other time periods other than the DyBM trustworthy prediction time period from among a plurality of time periods, when a sum of the future mean prediction and the future standard deviation prediction and the Hellinger distance is equal to or less than a threshold.

10. The computer-implemented method of claim 1, wherein the Hellinger distance is computed by taking a moving average of the Hellinger Distance over a particular time period.

11. A computer program product for commodity management, the computer program product comprising a non-transitory computer readable storage medium having program instructions embodied therewith, the program instructions executable by a computer to cause the computer to perform a method comprising:
   generating, by a processor using a Dynamic Boltzmann Machine (DyBM), both a future mean prediction and a future standard deviation prediction of a financial time-series dataset for a commodity;
   measuring, by the processor using Hellinger Distance (HD), an accuracy of the future mean prediction and the future standard deviation prediction;
   combining, by the processor, the future mean prediction and the future standard deviation prediction of the DyBM with the Hellinger Distance to determine a DyBM trustworthy prediction time period in which predictions by the DyBM, including the future mean prediction and the future standard deviation prediction, are deemed trustworthy; and
   selectively performing, by the processor, an action relating to an ownership of the commodity based on at least one of the future mean prediction and the future standard deviation prediction, responsive to the future mean prediction and the future standard deviation prediction being generated during the DyBM trustworthy prediction time period.

12. The computer program product of claim 11, wherein the DyBM comprises two DyBMs, and wherein the future mean prediction and the future standard deviation prediction are predicted separately by the two DyBMs.

13. The computer program product of claim 11, wherein the future mean prediction and the future standard deviation prediction are predicted collectively by only one DyBM.

14. The computer program product of claim 11, wherein the Hellinger Distance takes into account the DyBM trustworthy prediction time period in which the DyBM can accurately predict both the future mean prediction and the future standard deviation prediction from among a plurality of periods, wherein the DyBM lacks a specified degree of accuracy during at least some of the plurality of periods other than the DyBM trustworthy prediction time period.

15. The computer program product of claim 11, wherein the action comprises a trading of the commodity.

16. The computer program product of claim 11, wherein the action comprises selling the commodity to mitigate a financial loss relating to keeping the commodity, responsive to the future mean prediction and the future standard deviation prediction of the DyBM being determined as trusted.

17. The computer program product of claim 11, wherein the action comprises buying the commodity to enhance a financial gain relating to a lack of ownership of the commodity, responsive to the future mean prediction and the future standard deviation prediction of the DyBM being determined as trusted.

18. The computer program product of claim 11, wherein the future mean prediction and the future standard deviation prediction of the DyBM are determined to be trusted, corresponding to the DyBM trustworthy prediction time period, when a sum of the future mean prediction and the future standard deviation prediction and the Hellinger distance is greater than a threshold.

19. The computer program product of claim 11, wherein the future mean prediction and the future standard deviation prediction of the DyBM are determined to be untrusted, corresponding to other time periods other than the DyBM trustworthy prediction time period from among a plurality of time periods, when a sum of the future mean prediction and the future standard deviation prediction and the Hellinger distance is equal to or less than a threshold.

20. A computer processing system for commodity management, comprising:
   a memory for storing program code; and
   a processor operatively coupled to the memory for running the program code to
      generate, using a Dynamic Boltzmann Machine (DyBM), both a future mean prediction and a future standard deviation prediction of a financial time-series dataset for a commodity;
      measure, using Hellinger Distance (HD), an accuracy of the future mean prediction and the future standard deviation prediction;
      combine the future mean prediction and the future standard deviation prediction of the DyBM with the Hellinger Distance to determine a DyBM trustworthy prediction time period in which predictions by the DyBM, including the future mean prediction and the future standard deviation prediction, are deemed trustworthy; and
      selectively perform an action relating to an ownership of the commodity based on at least one of the future mean prediction and the future standard deviation prediction, responsive to the future mean prediction and the future standard deviation prediction being generated during the DyBM trustworthy prediction time period.

* * * * *